No. 878,754. PATENTED FEB. 11, 1908.
A. SULLIVAN.
VEHICLE WHEEL.
APPLICATION FILED APR. 17, 1907.
2 SHEETS—SHEET 1.
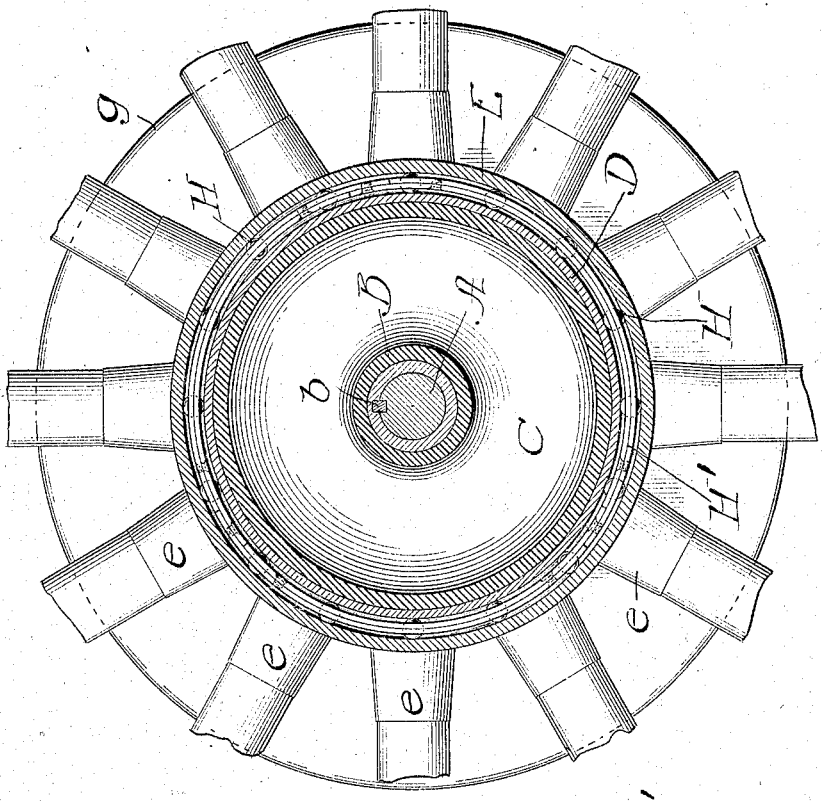
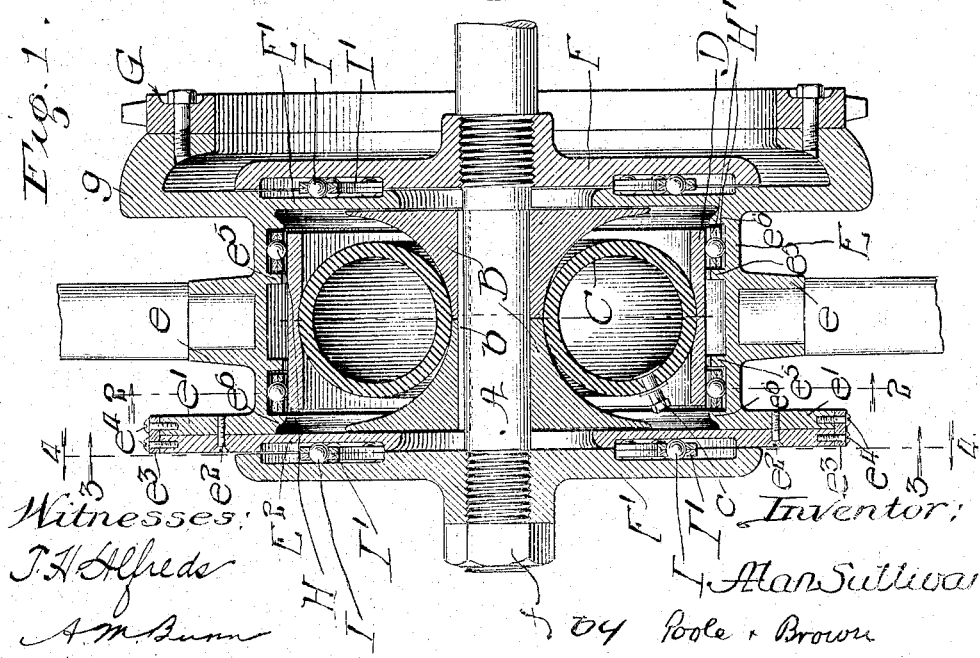

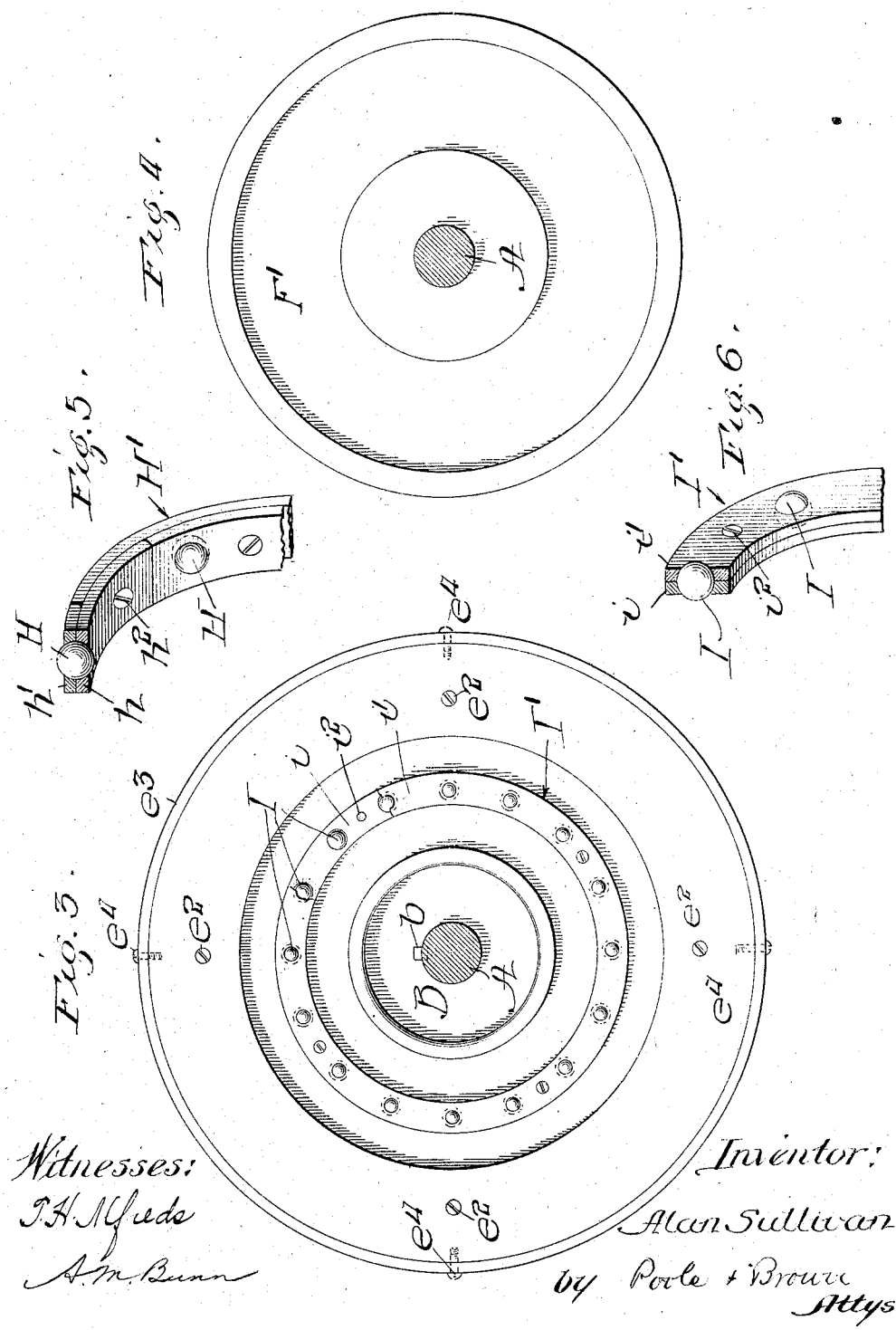

UNITED STATES PATENT OFFICE.

ALAN SULLIVAN, OF TORONTO, ONTARIO, CANADA, ASSIGNOR TO GRAHAME JONES, OF CHICAGO, ILLINOIS.

VEHICLE-WHEEL.

No. 878,754.　　　　Specification of Letters Patent.　　　　Patented Feb. 11, 1908.

Application filed April 17, 1907. Serial No. 368,632.

*To all whom it may concern:*

Be it known that I, ALAN SULLIVAN, a citizen of Toronto, Canada, and a resident of Toronto, in the Province of Ontario, Canada, have invented certain new and useful Improvements in Vehicle-Wheels; and I do hereby declare that the following is a full, clear, and exact description thereof, reference being had to the accompanying drawings, and to the letters of reference marked thereon, which form a part of this specification.

This invention relates to cushioned or resilient vehicle wheels, and more especially to that class of such wheels in which the yielding or resilient member of the wheel is interposed between the axle and an annular member which surrounds the axle and on which the wheel hub turns.

The invention consists in the matters hereinafter more particularly described and pointed out in the appended claims.

My invention may be better understood by reference to the accompanying drawings, in which,—

Figure 1 is an axial section of my improved hub. Fig. 2 is a cross-section on the line 2—2 of Fig. 1. Fig. 3 is a cross-section on the line 3—3 of Fig. 1. Fig. 4 is a cross-section on the line 4—4 of Fig. 1. Fig. 5 is an enlarged perspective view of a portion of one of the ball caging rings included in my device. Fig. 6 is an enlarged perspective view of a portion of one of the ball caging rings for the thrust bearings included in my device.

I have shown in said drawings a form of my improved hub especially adapted for the drive wheels of automobiles or other mechanically propelled vehicles, but my improved hub is equally well adapted for wheels which are not drive wheels and for use in connection with vehicles of all kinds, whether mechanically propelled or not.

As shown in said drawings, A indicates the non-rotative rear axle of an automobile or other mechanically propelled vehicle.

B indicates a non-rotative grooved ring or sleeve, conveniently made in two parts meeting in a plane transverse to the axle A and secured upon the said axle A by means of a key $b$.

C indicates an annular flexible tube constituting a pneumatic cushion, encircling said grooved sleeve B and supporting upon its outer peripheral surface a non-rotative bearing ring D. Said flexible tube C is, when the parts are in condition for operation, filled with air under pressure and is provided with an inflating valve $c$ of any usual or preferred form. The grooved sleeve B is shaped to form an annular, concave seat for the tube C, adapted to hold said tube in place or to prevent it moving or shifting endwise to the axle. Said sleeve B is made considerably longer than the diameter of the tube, and the groove therein, which is nearly semi-circular in cross-sectional form, is considerably wider than the diameter of the tube, so that room will be afforded for the latter to spread sidewise when compressed or partially flattened. The bearing ring D is shown as made of cylindric form and as fitting closely around the tube C, being preferably provided with a slight groove or depression in its inner surface to receive the peripheral part of the said tube. Said ring D is shown as made somewhat narrower than the length of the sleeve B, so that its side edges will come inside of, or will not strike the outwardly projecting annular end portions or flanges of the sleeve in case of extreme compression of the tube.

The main part or body of the wheel hub consists of a ring or cylinder E provided on its outer peripheral surface with sockets $e$ adapted to receive the inner ends of the wheel spokes. The bearing ring D, supported on the tube C as aforesaid, constitutes in effect the bearing or journal for the body E of the hub, which latter turns or rotates on said bearing ring; anti-friction ball bearings being provided between said bearing ring and hub body E as hereinafter described.

F and $F^1$ indicate thrust plates or disks which are non-rotatively secured to the axle A exterior to the ends of the sleeve B and which extend outwardly from the axle so as to engage the ends of the wheel hub and take the end thrust of the latter. Said disks F $F^1$ are shown in the accompanying drawings as having screw-threaded connection with the axle A, the screw-threads being preferably arranged in such manner that any tendency of said plates to turn by frictional engagement with the hub will cause them to be tightened upon the axle. The inner disk F is shown as having its central part in bearing against an outwardly facing shoulder on the axle, while the outer disk $F^1$ is secured on the axle by a lock nut $f$. The cylindric body E of the wheel hub is provided at its ends with inwardly extending annular flanges, or flange-rings $E^1$ and $E^2$ rigidly attached thereto and extending inwardly along the inner faces of the disks F and $F^1$. The inner margins of said flange-rings $E^1$ and $E^2$ extend into the spaces or grooves formed between the ends of said sleeve B and the inner parts of said disks F $F^1$. Said inwardly extending flange-rings $E^1$, $E^2$ serve to transmit the end thrust of the wheel hub to the said disks F $F^1$, and have bearing engagement with the said disks F and $F^1$, preferably through the medium of anti-friction ball bearings interposed between said parts, as hereinafter described.

As illustrated in the drawings, the flange-ring $E^1$ is formed integral with the inner end of the cylindric hub body E, while the flange-ring $E^2$ is made separate from and is detachably secured to the outer end of the hub body. In the particular construction shown, the hub body E is provided at its outer end with an outwardly extending integral flange $e^1$ to which the outer marginal part of the flange-ring $E^2$ is secured by means of screws $e^2$. Said flange ring is further secured to the hub body by means of an encircling ring $e^3$ secured to the said flange-ring and to the flange $e^1$ by means of screws $e^4$. Upon the inner margin of the cylindric body E of the hub is an outwardly extending rim $g$, having the form of an integral flange on said body E, and to which is bolted a sprocket ring G constituting the driving sprocket for the wheel. By removing the outer disk $F^1$ from the axle and detaching the flange-ring $E^2$ from the hub body, access may be had to the inflating valve $c$ of the tube C.

In the operation of the wheel made as described, the axle A, the sleeve B, flexible tube C and ring D are non-rotative, while the wheel-hub embracing the cylindric body E and the flanges $E^1$ and $E^2$ turn on or are carried by the ring D. The tube C being distended by the pressure of the air therein, tends to retain the ring D in a concentric position relatively to the axle A while being adapted to yield by compression of its lower part to permit vertical movement of the ring D and the wheel hub relatively to the axle, the said tube, by its resiliency or cushioning action, serving to absorb shocks or jars coming on the wheel rim or to prevent such shocks or jars being transmitted to the axle and the vehicle. The engagement of the inwardly extending flange-rings $E^1$ and $E^2$ with the disks F $F^1$ serves to take the end thrust coming on the wheel hub in both directions, while maintaining the plane of the wheel perpendicular to its axis of rotation. In other words, such flange-rings $E^1$ and $E^2$, by their engagement with the disks F $F^1$ in the axle, serve to hold said hub from moving or shifting endwise relatively to the axle and maintain the central axis of the wheel parallel with the central axis of the axle while at the same time permitting free vertical movement of the hub and wheel relatively to the axle so far as permitted by the resiliency or cushioning action of the pneumatic tube C.

Now referring to the construction of the anti-friction ball bearings located between the non-rotative ring D and the body E of the wheel hub, these are made as follows: In a space between the outer peripheral surface of said ring D and the inner peripheral surface of the cylindric body E of the hub, are located two sets of balls H which bear against or move in contact with annular outwardly and inwardly facing bearing surfaces on said ring D and hub E. Said balls are held or confined in two caging rings $H^1$ $H^1$, which caging rings are provided with recesses for receiving the balls, which recesses open through the inner and outer faces of the caging rings, the balls being of such diameter as to extend beyond the inner and outer peripheral surfaces of said rings. As shown in Fig. 5, each of the rings $H^1$ consists of a plurality of inner and outer overlapping, curved segments $h$ $h^1$ secured together by means of screws $h^2$. The ball receiving recesses are formed in each instance, one-half in an outer and one-half in an inner segment; the ring being made in parts or segments in order to permit the insertion of the balls in the said recesses. The said caging rings with the balls H carried thereby are shown as held in position adjacent to the opposite side margins of the cylindric ring D by means of inwardly projecting, integral annular flanges $e^5$ $e^6$ formed on the inner peripheral surface of said body E of the hub and constituting grooves in which the said caging rings are placed and held.

The anti-friction ball bearings between the stationary disks F and $F^1$ on the axle and the flange-rings $E^1$ $E^2$ on the wheel hub are made as follows: In the adjacent faces of said disks F and $F^1$ and flanges $E^1$ and $E^2$ are formed wide, annular recesses, which together constitute spaces or chambers, each adapted to receive one of the sets of balls I I, which balls are adapted to bear against the opposing, parallel, flat bearing faces of the said disks and flange-rings. Each set of balls is held in a caging ring $I^1$, which latter are provided with recesses opening through the flat side faces thereof; the balls being of such diameter as to extend beyond the outer lateral faces of said caging rings. Said caging rings $I^1$ $I^1$ consist each of two flat rings $i$ $i^1$ secured together by screws $i^2$, each ring $i$ and $i^1$ having formed therein one half of each of the ball containing recesses. The diameter of each caging ring $I^1$ $I^1$ is larger than the smaller diameters of the annular recesses in the disks F and $F^1$, and flange-rings $E^1$ E² and smaller than the larger diameter of said recesses. The anti-friction balls arranged as described are manifestly adapted to take the end thrust of the hub in both directions while, at the same time, permitting universal movement or movement in all directions of the hub relatively to the axle, in a plane perpendicular to said axle. It may be observed in connection with the caging rings arranged as described, that when the hub is not rotating the said rings may drop down until they rest in the bottoms of the recesses in which they are located, but when the hub is turning the centrifugal force generated will tend to bring said caging rings into a position concentric with the hub.

It will be manifest that instead of the flexible tube C constituting a pneumatic cushion, any other form of cushioning or resilient ring or annulus may be interposed between the sleeve B and the bearing ring D, and I do not, therefore, wish to have my invention limited to this respect, except so far as the specific construction illustrated may be particularly claimed in the appended claims.

I claim as my invention:—

1. The combination with a non-rotative axle provided with an annular seat, of a non-rotative bearing ring surrounding said axle, an annular, resilient cushion member interposed between said seat and the said bearing ring, a wheel-hub surrounding and turning on said bearing ring, said wheel-hub being provided at its ends with annular, inwardly extending flange-rings, disks attached to and extending outwardly from the axle exterior to and in overlapping relation to the said flange-rings, the disk on the outer end of the axle and the flange-ring on the outer end of the hub being detachably secured to said axle and hub to permit the assembling and separation of the parts.

2. The combination with a non-rotative axle provided with a sleeve having an annular seat, of a non-rotative bearing ring surrounding said axle, an annular, resilient, cushion member interposed between said seat and the said bearing ring, a wheel-hub surrounding and turning on said bearing ring, anti-friction ball bearings between said hub and the said bearing ring comprising a plurality of sets of balls and a plurality of caging rings for said balls, and disks attached to the axle and extending outwardly therefrom into engagement with the ends of the wheel-hub.

3. The combination with a non-rotative axle provided with a sleeve having an annular seat, of a non-rotative bearing ring surrounding said axle, an annular, resilient, cushion member interposed between said seat and the said bearing ring, a wheel hub turning on said bearing ring and provided at its ends with flange-rings, disks attached to and extending outwardly from the axle in overlapping relation to the said flange-rings, anti-friction ball bearings between the said disks and flange-rings embracing balls interposed between flat, parallel bearing surfaces on the disks and flange-rings, and caging rings for said balls.

4. The combination with a non-rotative axle provided with a sleeve having an annular seat, of a non-rotative bearing ring surrounding said axle, an annular, resilient, cushion member interposed between said seat and said bearing ring, a wheel-hub adapted to turn on said bearing ring and provided at its ends with annular flange-rings, disks attached to and extending outwardly from the axle in overlapping relation to the said flange-rings, anti-friction ball-bearings between the said hub and bearing ring, comprising a plurality of balls located between outwardly facing annular bearing surfaces on the said bearing ring and the inwardly facing annular bearing surface on the hub, and caging rings for said balls, and anti-friction ball-bearings between the said disks and the flange-rings on the hub, comprising balls located between flat, parallel opposing faces on the said disks and flange-rings and caging rings for said balls.

5. The combination with a non-rotative axle provided with a sleeve having an annular seat, of a non-rotative bearing ring surrounding said axle, an annular, resilient, cushion member interposed between the said seat and the bearing ring, a wheel-hub surrounding and turning on said bearing ring, disks secured to the axle and extending outwardly therefrom into engagement with the ends of the wheel-hub to take the end thrust of the latter, and an annular sprocket ring secured to one end of said wheel-hub.

In testimony that I claim the foregoing as my invention I affix my signature in the presence of two witnesses, this eleventh day of April A. D. 1907.

ALAN SULLIVAN.

Witnesses:
FRED. B. FETHERSTONHAUGH,
B. BOYD.